United States Patent [19]
Vind

[11] Patent Number: 5,707,198
[45] Date of Patent: Jan. 13, 1998

[54] METHOD AND DEVICE FOR DISCHARGING PARTICULATE MATERIAL FROM A PRESSURIZED CONTAINER

[75] Inventor: Tyge Vind, Finspong, Sweden

[73] Assignee: ABB Carbon AB, Finspong, Sweden

[21] Appl. No.: 411,658

[22] PCT Filed: Sep. 23, 1993

[86] PCT No.: PCT/SE93/00767

§ 371 Date: Apr. 6, 1995

§ 102(e) Date: Apr. 6, 1995

[87] PCT Pub. No.: WO94/07596

PCT Pub. Date: Apr. 14, 1994

[30] Foreign Application Priority Data

Oct. 7, 1992 [SE] Sweden ................... 9202928

[51] Int. Cl.$^6$ ............................................. B65G 53/66
[52] U.S. Cl. ........................... 414/219; 414/221; 406/175
[58] Field of Search .................................. 414/161, 200, 414/219, 220, 221; 406/175, 65, 154, 168, 195

[56] References Cited

U.S. PATENT DOCUMENTS

| | | | |
|---|---|---|---|
| 2,684,897 | 7/1954 | Diettrich | 414/161 X |
| 2,834,665 | 5/1958 | Rudolph et al. | 414/221 X |
| 4,115,070 | 9/1978 | Jukkola et al. | 406/168 X |
| 4,205,931 | 6/1980 | Singer et al. | 406/175 X |
| 4,401,402 | 8/1983 | Casperson | 414/221 X |
| 4,459,071 | 7/1984 | Norton . | |
| 4,530,207 | 7/1985 | Brannstrom . | |
| 4,802,796 | 2/1989 | Brännström | 406/195 X |
| 4,860,669 | 8/1989 | Collins, Jr. et al. | 414/220 X |
| 5,066,186 | 11/1991 | Shimada et al. | 414/291 X |

FOREIGN PATENT DOCUMENTS

| | | | |
|---|---|---|---|
| 2711114 | 9/1978 | Germany | 414/200 |
| 462 217 | 5/1990 | Sweden . | |
| 1518254 | 10/1989 | U.S.S.R. | 406/175 |

OTHER PUBLICATIONS

Hanway, Jr. et al., Discharge and Handling of Solids From Pressurized Fluidized-Bed Combustors, Oct. 1982, pp. 5–7 and 10–26.

Institute of Gas Technology, "Continuous Depressurization of Solids Using a Restricted Pipe Discharge System," Knowlton et al, No. 276, vol. 86, pp. 61–72; at least as early as Apr. 1992.

*Primary Examiner*—James W. Keenan
*Attorney, Agent, or Firm*—Pollock, Vande Sande & Priddy

[57] ABSTRACT

A method of discharging particulate material from a first container to a lower positioned storage area being under a lower pressure than the first container. Particulate material is discharged via an upper tube section of a discharge tube communicating with the first container and permanently containing a column of the particulate material. The discharged material is directed into a pressurized stabilizer. The discharged material is directed via a lower tube section to a material feeder for forming columns of the particulate material in the upper and lower tube sections thereby reducing the pressure of the material to a predetermined normal pressure level at the input of the feeder. The material is fed to the storage area. The quantity of discharged material is controlled by the feeder. Gas flowing from the first container is extracted through the particulate material column to an environment via a throttle at an upper portion of the pressure stabilizer, thus stabilizing the discharge by making it independent of pressure variations in the particulate material column upstream of the pressure stabilizer. The feeder is stopped when a pressure increases in the particle column in the upper tube section resulting in a pressure increase in the pressure stabilizer until the pressure of the pressure stabilizer has returned to the normal level due to the extraction of gas.

2 Claims, 1 Drawing Sheet

METHOD AND DEVICE FOR DISCHARGING PARTICULATE MATERIAL FROM A PRESSURIZED CONTAINER

TECHNICAL FIELD

The invention relates to a method and a device for discharging particulate material from a container which is under pressure into a container at a lower pressure, usually atmospheric pressure. The invention is primarily intended for discharging residual products from a combustor.

BACKGROUND OF THE INVENTION

Discharging and handling solid residual products such as bed material, ash and slag products from a combustor operating at pressure levels up to 20 bar or more, for example a PFBC power plant, entail difficult problems. Lock hopper systems can be used, however the material is often greatly erosive, which entails considerable stresses on valves in the lock hopper systems and a rapid reduction of their sealing capacity. The service life is short and the maintenance costs high. The problems with discharge of solid material from a pressurized combustor are dealt with in a publication from Argonne National Laboratory, Argonne Ill., ANL/CEN/FE-81-3 entitled "Discharge and Handling of solids from Pressurized Fluidized Bed Combustors" by John E. Hanway and W. F. Podolski. European patent specification 0 108 505 describes a pressure-reducing discharge system without valves.

One object of the present invention is to provide a simplified discharge system for particulate material from a pressurized container with low service needs. The particulate material primarily relates to residual products in the form of ash and dust particles from a pressurized combustor with combustion in a fluidized bed. Another object is to achieve a more uniform discharge than in a lock hopper system. Still other objects are to reduce the number of valves and the gas consumption in discharge systems.

Swedish patent application 8803599-3 describes a proposal for a technical solution for the above-mentioned problems in connection with the discharge of particulate material (in the following also referred to by the term particles) and which, in addition, fulfils certain objects of the present invention. The Swedish specification discloses a device in which the reduction of pressure when discharging particles from a pressurized container is brought about by discharging the particles via a substantially vertical tube, wherein an upright column in the form of particles of discharged particulate material is built up in the tube. By allowing this particle column to become sufficiently high, the particle column gives rise to a pressure reduction in the accompanying gas from the pressure container as the gas is forced to flow through the upright particle column. If the particle column is sufficient high, a pressure reduction of the gas to atmospheric pressure can be obtained. Particulate material in the lowermost part of the particle column is discharged by means of a rotary vane feeder.

A disadvantage with pressure reduction in a particle column of the above known kind is that instability may arise. As an example, the discharge of the particulate material must be controlled by some form of control device. This will give the particle column different heights in the course of time. When the particle column is shorter, a higher pressure difference arises in the particle column along each section of the particle column, which results in a higher speed of the gas flow and a higher propelling force on the material in the particle column. Also the discharged material may influence the stability in the discharge device. If suddenly a larger percentage of coarser particles or fine particles cemented together into lumps are included in the particle column, gas paths may arise therein. This causes a more rapid gas flow which in turn influences the particle flow through the discharge device, whereby the pressure reduction which was to be achieved by the resistance of the particle column to gas flow does not function as intended.

SUMMARY OF THE INVENTION

The present invention relates to a method and a device for discharging particulate material from a container which is under pressure and located at a higher level to a storage means which is under a lower pressure and is located at a lower level, via a preferably vertical cube and further via a flow-controlling material feeder. The particulate material which is discharged forms, in the tube, a column of particles which by their flow resistance achieve a pressure reduction over this particle column in the gas which from the higher container flows through the particle column. The discharge is stabilized with respect to variations in gas flow by the particle column extending through at least one pressure stabilizer comprising a vessel which is connected by a throttle means to an environment, the pressure level of the particle column at the pressure stabilizer being maintained stable in relation to the pressure at the orifice of the discharge tube since increases of the pressure of the gas accompanying the particles are limited by discharging gas to the surroundings via the throttle means.

The great flow resistance in the particle column considerably restricts gas flow. Extraction of gas via the throttle means of the pressure stabilizer takes place continuously. The pressure stabilizer comprises a vessel into which the particle column opens. A throttle means, for example in the form of a Laval nozzle, is connected to the vessel, and gas is extracted to the surroundings, usually the atmosphere, through this nozzle. In the pressure stabilizer the flow-out of gas is formed such that the particulate material does not move with the extracted gas flow which is determined by, and passes out through, the throttle means. From the lower part of the vessel of the pressure stabilizer, the discharge tube with its particle column extends further down into a material feeder.

If, for example, the container with the higher pressure from where particulate material is fed out is subjected to a pressure increase, the pressure in the pressure stabilizer vessel will rise. As a further example, the pressure rises in the pressure stabilizer vessel at a position where the flow resistance is reduced in the particle column upstream of the pressure stabilizer. In case of such changes of the pressure conditions, the discharge of particulate material via the material feeder is stopped at the bottom part of the discharge tube. Gas is now automatically extracted via the throttle means from the pressure stabilizer vessel to the surroundings with a larger extracted gas flow than normal until the pressure in the pressure stabilizer returns to normal conditions, whereupon the material feeder can resume the discharge of dust. The pressure increase in the discharge tube caused by the above abnormal conditions must not reach the orifice of the particle column in the material feeder, which is avoided with the extra extraction of gas via the throttle means as described above.

Since a pressure difference between the upstream and downstream sides of the material feeder can be avoided in the manner described, the material feeder is not subjected to stresses caused by pressure differences between its inlet and outlet, which allows use of a simple rotary vane feeder and to obtain good reliability.

The discharge of particulate material also functions without a pressure difference across the particle column since the particulate material, by its own weight, moves downwardly in the discharge system, where discharge of particles takes place from a higher to a lower level. When no pressure difference occurs, the discharge system can be emptied and filled with particulate material without any need for the accessory devices described in this invention.

Discharge of occasional larger lumps (sinters etc.) functions under all operating conditions in the discharge device.

DETAILED DESCRIPTION OF THE PREFERRED EMBODIMENTS

An embodiment of the invention will be described with reference to the figures. In the embodiment, reference is made to the method of discharge and the device in a PFBC power plant, where discharge of particulate material according to the invention can be utilized both for discharge of ashes and residual products from a bed vessel and discharge of separated ashes from dust separators; for example cyclones, which separate dust in waste gases from the plant. In both cases, the discharge is performed from a pressurized container.

Figure 1:
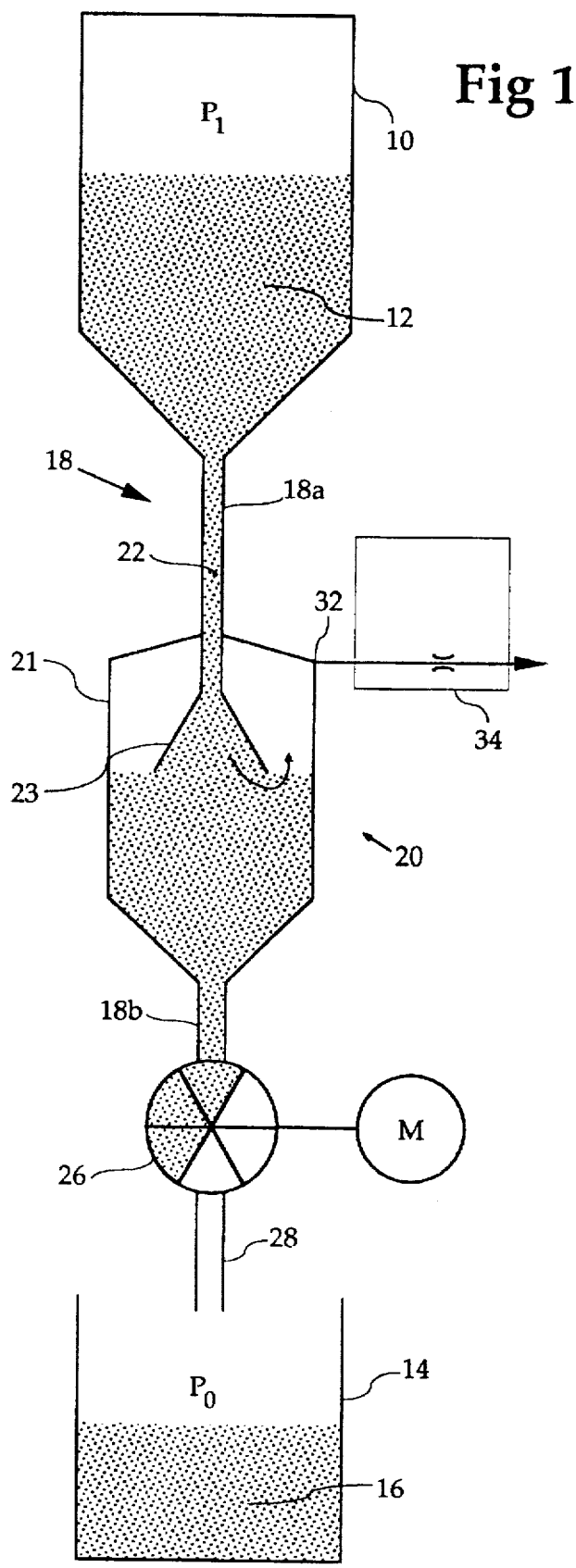
FIG. 1 schematically illustrates a discharge device for dust from a pressurized container according to the invention.

FIG. 1 shows a first container 10 for particulate material, preferably ashes. In this first container, the pressure $P_1$ prevails, which considerably exceeds atmospheric pressure. A second container 14 is a container with the pressure $P_0$ which, in a store 16, receives fed-out particulate material. The pressure $P_0$ is usually the same as atmospheric pressure but may, of course, have a different value. In the case where the pressure $P_0$ is at atmospheric pressure, the material storage means 16 may consist of only a storage container 16 for particulate material, and a second container 14 for the storage 16 is not required. A discharge tube 18, divided into an upper tube section 18a and a lower tube section 18b, from the first container 10 is vertically oriented but may have a different inclination; for example to reduce the necessary overall height of the discharge device.

The upper tube section 18a extends into a pressure stabilizer 20, which comprises a vessel 21. From the vessel 21, gas is extracted which flows through a particle column 22 formed in the tube 18 during discharge.

Downstream of the pressure stabilizer 20, the discharge tube 18 continues with the lower tube section 18b, to the outlet of which a rotary vane feeder 26 is arranged. The lower tube section 18b need not have any real extension in the longitudinal direction but may quite simply constitute an inlet opening to the rotary vane feeder 26 or to another type of dust discharge device, for example an L valve 27.

An outlet tube 28 from the rotary vane feeder 26 opens into the second container 14. The rotary vane feeder 26 is driven by a motor M, the speed of which can be controlled to vary the capacity of the rotary vane feeder 26.

The vessel 21 is provided with an outlet 32 for extraction of gas which flows through the particle column 22 in the discharge tube 18 during discharge. The outlet 32, in turn, is equipped with a throttle means 34 for determining the extracted gas flow.

Figure 2A:
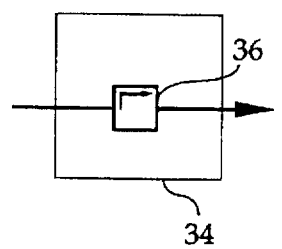
FIGS. 2a–2c show a number of modifications of the embodiment of the throttle means which controls the gas flow-out of the pressure stabilizer.
Figure 2B:
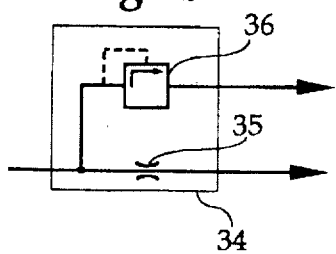
Figure 2C:
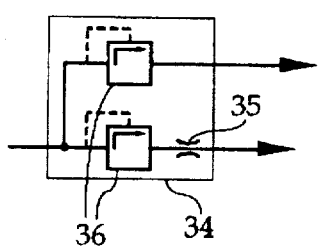
Figure 3:
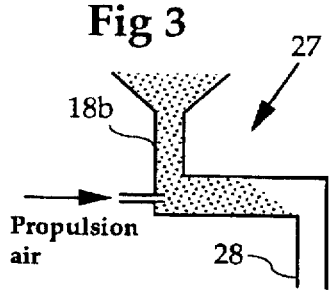
FIG. 3 illustrates a modified embodiment of a material feeder in the form of an L-valve.

The throttle means 34 can suitably consist of only a simple throttling of the gas flow achieved by means of a Laval nozzle or by means of a simple fixed throttle washer, both variants being illustrated in FIGS. 2b and 2c, respectively, as 35. However, other types of throttle means may be used as well. Thus, the throttle means 34 may consist of a pressure-maintaining valve 36.

Further, according to FIG. 2b, the throttle means 34 can be in the form of a fixed throttle means 35 in parallel with a pressure-maintaining valve 36. A further example is shown in FIG. 2c, where a pressure-maintaining valve 36 in series with a simple fixed throttle means 36 connected in parallel with an additional pressure-maintaining valve 36.

During discharge, a particle column 22 is formed in the tube 18a. The particles in the particulate material 12 fall down into the discharge tube 18 by their own weight and while being influenced by the gas which flows from the first container 10 down into the tube 18. The upper tube section 18a of this tube 18 is inserted a certain distance into the vessel 21 and opens approximately halfway down into the vessel 21. The orifice 23 of the upper tube section 18a is conically shaped.

When particles in the particle column 22 exit through the orifice 23, they are collected in the vessel 21, whereby particles will be stored to a certain level in the vessel 21. Part of the gas flowing through the particle column 22 is extracted via the outlet 32 and part of the gas flows on through the lower tube section 18b of the discharge tube 18 down to the rotary vane feeder 26.

To prevent particles in the fed-out dust from accompanying the gas which is extracted via the outlet 32, the orifice 23 is conical, which means that the particles with their greater inertia cannot accompany the extracted gas but are slowed ahead of the outlet 32 without, at the same time, creating too much turbulence at the orifice of the discharge tube 18 inside the vessel 21.

The gas speed past the conical orifice 23 and elsewhere in the vessel 21 must not become so high (locally or generally) that the movement in the dust becomes so great as to cause instability. Such instability may, for example, occur if the gas speed in the vessel 21 becomes so high that particulate material is forced by the gas flow to the outlet 32 or that the particulate material is fluidized upstream of the outlet 32.

The area ratio between different areas in the pressure stabilizer 20 determines the stability of the discharge. The area of the cone orifice 23 in relation to the area at the outlet 32 is an example of such an area ratio. A number of other parameters determine this area ratio. In a PFBC plant, for example, the area ratio described is dependent on the grain size of the particulate material. For bed ash, using a rough measure as an example, the ratio of the cone orifice 23 to the outlet 32 may be 100:1, whereas the corresponding area ratio for fine cyclone ash may roughly be described as 10000:1.

By choosing the diameter and length of the discharge tube 18 and hence the height of the particle column 22, the desired flow resistance can be attained in the particle column 22 and a tolerable gas flow from the first container 10 be obtained. By simultaneous choice of parameters for gas extraction in the throttle means 34, a tolerable fall of pressure across the dust discharge device (26, 27) can be obtained.

I claim:

1. A method of discharging particulate material from a first container to a lower positioned storage means being under a lower pressure than the first container, said method comprising the steps of:

- discharging particulate material via an upper tube section of a discharge tube communicating with said first container and permanently containing a column of the particulate material;
- directing the discharged material into a pressurized stabilizer;
- directing the discharged material via a lower tube section to a material feeder for forming columns of the particulate material in said upper and lower tube sections thereby reducing the pressure of the material to a predetermined normal pressure level at the input of said feeder;
- feeding the material to the storage means;
- controlling the quantity of discharged material by means of said feeder;
- extracting gas flowing from the first container through said particulate material column to an environment via a throttle means at an upper portion of said pressure stabilizer, thus stabilizing the discharge of material by making it independent of pressure variations in said particulate material column upstream of said pressure stabilizer; and
- stopping the feeder when a pressure increases in said particle column in said upper tube section resulting in a pressure increase in said pressure stabilizer until the pressure of said pressure stabilizer has returned to said normal level due to said extraction of gas.

2. A method according to claim 1, comprising the step of designing said throttle means for a predetermined flow of the extracted gas.

* * * * *